United States Patent [19]

Ohkubo et al.

[11] 4,434,431

[45] Feb. 28, 1984

[54] MULTILEVEL IMAGE PRINTING DEVICE

[75] Inventors: Tetsuo Ohkubo; Yoshio Arai; Hiroyuki Kataoka, all of Kanagawa, Japan

[73] Assignee: Fuji Xerox Co., Ltd., Kanagawa, Japan

[21] Appl. No.: 272,232

[22] Filed: Jun. 10, 1981

[30] Foreign Application Priority Data

Jun. 13, 1980 [JP] Japan .................. 55-79053

[51] Int. Cl.³ ............................................ G01D 15/14
[52] U.S. Cl. .................................. 346/154; 346/160; 358/298
[58] Field of Search ............... 346/76 L, 108, 109, 346/153.1, 154, 160; 358/298, 299, 300

[56] References Cited

U.S. PATENT DOCUMENTS 3,698,006 10/1972 Ovshinsky ........................... 346/160
4,197,560 4/1980 Minerd ............................ 346/160 X
4,251,825 2/1981 Mikami et al. ..................... 346/109
4,375,064 2/1983 Ohara .............................. 346/108

*Primary Examiner*—Thomas H. Tarcza
*Attorney, Agent, or Firm*—Sughrue, Mion, Zinn, Macpeak and Seas

[57] ABSTRACT

A multilevel image printing device in which a laser beam is scanned onto the surface of a photoconductive drum with plural intensity levels without the use of a modulator. A multilevel image outputting circuit produces a multilevel signal which is applied to a multilevel image signal to laser beam conversion circuit which converts it into an intensity value for operating a semiconductor laser beam source. The multilevel image signal to laser beam conversion circuit includes plural switches which are operated in response to the multilevel image signal coupled through resistors of different values which determine the voltage applied to the semiconductor laser beam source.

8 Claims, 5 Drawing Figures

MULTILEVEL IMAGE PRINTING DEVICE

BACKGROUND OF THE INVENTION

The present invention relates to laser printers, and more particularly to a multilevel image printing device which can produce half-tones.

In a conventional laser printer, as shwon in FIG. 1, a constant power laser beam 1 is outputted by a laser beam source 1, an image signal outputted by an image outputting section 4 is applied to a drive circuit 3, and a modulator 2 is controlled by the output of the drive circuit 3, wherein the constant power laser beam outputted by the laser beam source 1 is modulated in accordance with the image signal. The laser beam thus modulated is applied to a recording sheet to form an image thereon using a conventional method.

In a conventional laser printer of this type, the laser beam is modulated with only two levels (white and black levels). That is, such a printer which can print only two levels of density cannot produce a multilevel image print. Furthermore, the conventional laser printer is disadvantageous in that it requires a modulator.

A laser printer for printing a multilevel image is available which prints a multilevel image by decreasing the picture element density of a recording sheet as shown in FIG. 2. In this laser printer, each of the picture elements 5a, 5b, 5c, etc. is divided into n regions (n being an integer larger than one), and half-tones are reproduced by the utilization of the number of black elements of the n regions. However, this method suffers from a drawback in that the picture element density is lowered.

An object of this invention is thus to provide a multilevel image printing device in which the difficulties accompanying the above-described two methods have been eliminated, the provision of the modulator is unnecessary, the picture element density is high, and half-tones can be reproduced.

SUMMARY OF THE INVENTION

In accordance with the invention, a laser beam source is directly controlled by the output of a circuit adapted to convert a multilevel image signal into a laser beam whose intensity corresponds to the signal so that the output laser beam of the laser beam source is directly modulated.

More specifically, the invention provides a multilevel image printing device including a multilevel image outputting circuit for outputting a multilevel image signal, a multilevel image signal to laser beam conversion circuit for converting the multilevel image signal into a laser beam having an intensity corresponding to the multilevel image signal, a laser beam source driven by the multilevel image signal to laser beam conversion circuit with the laser beam source outputting a laser beam modulator with at least two gradations in response thereto, a photoconductive surface, and means for scanning the modulated laser beam onto the photoconductive surface.

DESCRIPTION OF THE PREFERRED EMBODIMENTS

A preferred embodiment of an image printing device of the invention will be described with reference to FIG. 3.

Figure 3:
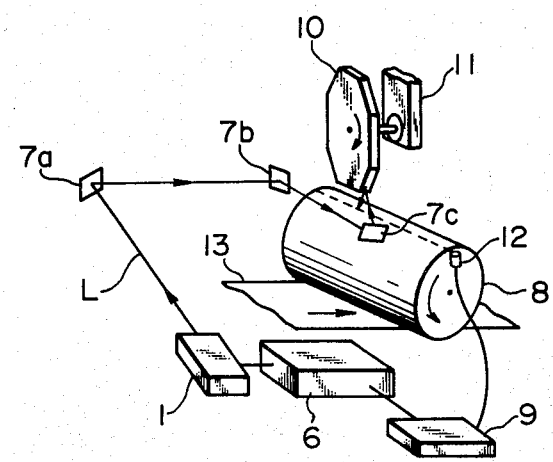
FIG. 3 is an explanatory diagram showing the arrangement of a multilevel image printing device according to the invention.

In FIG. 3, reference numeral 1 designates a laser beam source, 6 a circuit for converting a multilevel image signal into a laser beam whose intensity corresponds to the signal (hereinafter referred to as "a multilevel image signal to laser beam conversion circuit 6" when applicable), 7a through 7c mirrors, 8 a photoconductive drum, 9 a multilevel image outputting circuit, 10 a scanner, 11 a scanner driving circuit, 12 a senser, or reading, element, and 13 a recording sheet.

In the above-described device, the reading element 12 is arranged beside one end of the photoconductive drum 8 to detect the start of laser beam scanning to thereby output a start signal. When the start signal is applied to the multilevel image outputting circuit 9, picture element data bearing gradation data is applied from the circuit 9 to the multilevel image signal to laser beam conversion circuit 6 at predetermined time intervals. The number of picture elements outputted as data by the multilevel image outputting circuit 9 whenever one start signal is applied thereto is predetermined, for instance, 10 picture elements/mm. Therefore, if the width of a sheet whose image is transferred is 210 mm, then 2100 picture elements are outputted.

The laser beam source 1 is driven by the conversion circuit 6 to output a laser beam L whose intensity corresponds to a multilevel image signal. The laser beam L is applied through the mirrors 7a, 7b and 7c to the scanner 10 and from there it is scanned onto the photoconductive drum 8 by the scanner 10. As a result, a latent image for one line is formed on the photoconductive drum 8. When the latent image for one line has been formed, the next start signal is inputted to the multilevel image outputting circuit 9. In the same manner, latent images are formed line-by-line on the photoconductive drum 8. The latent images thus formed are transferred onto the recording sheet 13 using a conventional process.

Figure 1:
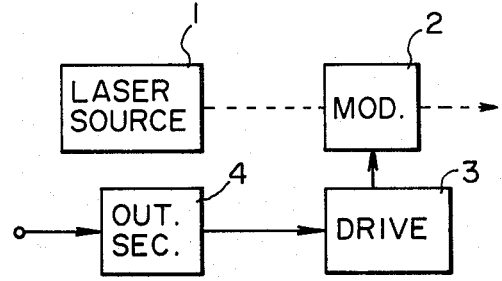
FIG. 1 is a block diagram showing a conventional laser printer.
Figure 2:
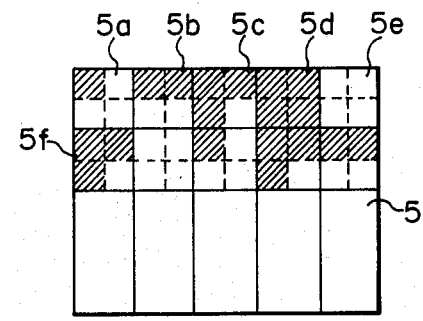
FIG. 2 is an explanatory diagram for a description of a conventional half-tone reproducing method.

The multilevel image printing device, unlike the conventional device shown in FIG. 1, requires no modulator. That is, as is apparent from a comparison of the device of the invention shown in FIG. 3 with the conventional device as shown in FIG. 1, the multilevel image outputting circuit 9 and the multilevel image signal to laser beam conversion circuit 6 in FIG. 3 correspond to the image outputting section 4 and the drive circuit 3 in FIG. 1. However, the device of the invention has nothing corresponding to the modulator 2 in FIG. 1.

Figure 4:
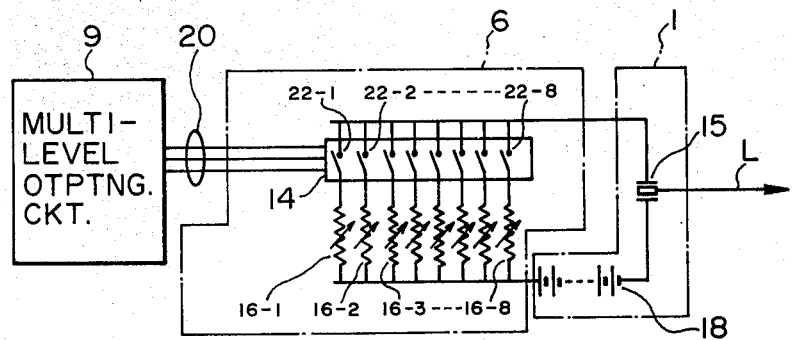
FIG. 4 is a circuit diagram showing an example of a multilevel image signal to laser beam conversion circuit.

FIG. 4 shows a specific example of the multilevel image signal to laser beam conversion circuit 6. The conversion circuit 6 includes a selector switch circuit 14 having a group of switches 22-1 through 22-8, and a group of resistors 16-1 through 16-8. The laser beam source 1 includes a semiconductor laser 15 and a power source 18. The voltage to be applied to the semiconductor laser 15 is determined by selecting one of the resistors.

It is assumed that a 3-bit digital signal representative of the density of a picture element is applied from the multilevel image outputting circuit 9 through a lead wire 20 to the selector switch circuit 14. In response to the digital signal, one of the switches 22-1 through 22-8 is closed. As a result, the voltage for driving the semiconductor laser 15 is determined, and a laser beam having an intensity corresponding to the density of the picture element is outputted by the semiconductor laser 15. The switches 22-1 through 22-8, and accordingly the resistors 16-1 through 16-8, are selected respectively according to the signals at the eight levels which are provided by the multilevel image outputting circuit 9, as a result of which laser beams at eight possible intensity levels can be outputted by the semiconductor laser 15.

In above-described example, one of the switches 22-1 through 22-8 is closed in response to the digital signal from the multilevel image outputting circuit 9. However, the invention is not limited thereto or thereby. That is, the circuit may be so designed that two or more switches are closed in response to the digital signal. In this case, the number of degrees of freedom in selection is determined by the number of combinations of resistors. This is compared to the case where the resistors 16-1 through 16-8 are selected only one at a time. Thus, it is evident that half-tones of more than eight gradations can be obtained by using eight resistors.

Figure 5:
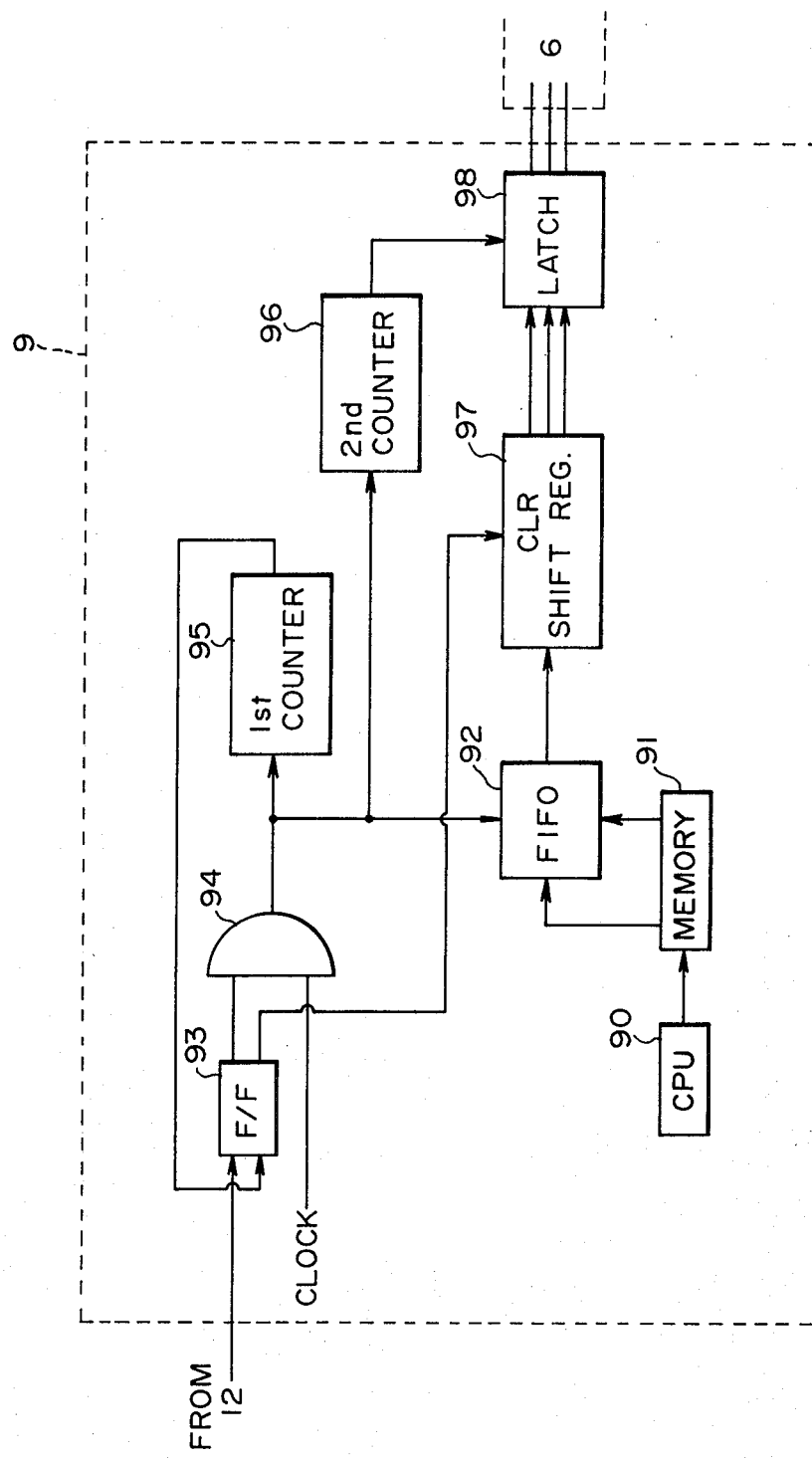
FIG. 5 is a circuit diagram of an image outputting circuit.

The multilevel image outputting circuit 9 will be described in detail with reference to FIG. 5.

A flip-flop 93 is provided which receives the start signal (trigger pulse) from the reading element 12. The flip-flop 93 is in the set condition until the start signal is applied thereto. In the set condition of the flip-flop 93, a 3-bit shift register 97 having a clear terminal connected to the reset terminal of the flip-flop 93 is cleared. The output of the shift-register 97 is applied through a latch circuit 98 to the multilevel image signal to laser beam conversion circuit 6. In the set condition of the flip-flop 93, the laser beam is outputted at the highest intensity due to the operation of the multilevel image signal to laser beam conversion circuit 6. The laser beam thus outputted is scanned onto the photoconductive drum 8 by means of the scanner 10. The laser beam is sensed by the reading element 12 which outputs the trigger pulse to the multilevel image outputting circuit 9. In response to the trigger pulse, the flip-flop 93 is set so that the set terminal thereof becomes high and thus an AND gate 94 to one input of which clock pulses are applied is enabled to thereby allow the clock pulses to be fed to a first counter 95, a FIFO (first in-first out) circuit 92, and a second counter 96.

As is well known in the art, FIFO circuits are capable of inputting and outputting data at input and output sides thereof with different clock pulses. The input side of the FIFO circuit 92 as used in this example is connected to a memory circuit 91 by parallel bus lines and the output side to the shift register 97 by way of a single output line. The memory circuit 91 is connected to a central processing unit (CPU) 90. In this example, since the gradation of one picture element is represented by a 3-bit digital signal, 3-bit data is subsequently fed to the FIFO circuit 92 from the memory circuit 91. Data stored in the FIFO circuit 92 is fed to the shift register 97 at every clock pulse.

The second counter 96 produces a strobe output to the latch circuit 98 for every three clock pulses. In response to the strobe output thus produced, the latch circuit 96 latches the data on the output of the shift register 97 and provides the data on the lines to multilevel image signal to laser beam conversion circuit 6. The first counter 95 is adapted to count a predetermined amount of data to be transmitted by one line scan. Specifically, if the number of picture elements on one line is 2,100, then 6,300 (=2,100×3, there being the number of bits corresponding to the number of possible gradations of one picture element) is counted by the counter 95. After one line of data is transmitted, the flip-flop 93 is reset in response to the output of the first counter 95 and again the AND gate 94 is disabled to thereby prohibit the application of clock pulses to the subsequent stages. The output from the FIFO circuit 92 is accordingly not produced. The above-described operation is repeatedly carried out.

It should be noted that the data fed from the memory circuit 91 to the FIFO circuit 92 and the data output from the latter circuit to the shift register 97 are carried out in a non-synchronous manner. The data from the memory circuit 97 to the FIFO circuit 92 is fed in such a way that the FIFO circuit 92 is full at all the times.

Although the foregoing description relates to the case where each picture element can have one of eight gradations as represented by a 3-bit digital signal, it is apparent that multilevel image printing can be performed with an n-bit digital signal capable of representing $2^n$ gradations.

As is apparent from the above description, a modulated light beam is outputted directly by the laser beam source according to the invention. Therefore, the invention is advantageous in that the printing device of the invention does not require a modulator, which is a necessary component of the conventional printing device, and the multilevel image printing device of the invention is simple in construction and low in manufacturing cost. Furthermore, with the printing device of the invention, an image can be printed with a high picture element density.

What is claimed is:

1. A multilevel image printing device comprising:
   a multilevel image outputting circuit for outputting a digital image signal indicative of a specific density level of said image, said specific density level being one of at least three possible discrete density levels;
   a multilevel image signal to laser beam conversion circuit for converting said digital image signal into a laser beam having a specific intensity level corresponding to said specific density level of said image;
   a laser beam source driven by said multilevel image signal to laser beam conversion circuit;
   said laser beam source outputting a laser beam modulated with at least three gradations corresponding to said at least three possible discrete density levels of said image;
   a photoconductive surface; and
   means for scanning the modulated laser beam onto said photoconductive surface.

2. The printing device of claim 1 wherein said photoconductive surface comprises a rotatable drum.

3. The printing device of claim 2 wherein said scanning means comprises a rotatable multi-faced mirror.

4. The printing device of claim 3 further comprising a reading element for detecting the presence of said laser beam at an end of said drum, an output of said reading element being coupled to synchronize said multilevel image outputting circuit.

5. The printing device of claims 1, 2, 3, or 4 wherein said multilevel image signal laser beam conversion circuit comprises switching means for applying a discrete voltage level determined by said digital image signal to said laser beam source.

6. A multilevel image printing device comprising:
a rotatable photoconductive drum;
a semiconductor laser beam source having first and second input terminals;
a multi-faced mirror for scanning an output laser beam from said laser beam source onto a surface of said photoconductive drum;
a multilevel image outputting circuit for outputting a multilevel image signal;
a multilevel image signal to laser beam conversion circuit for converting said multilevel image signal into a laser beam having an intensity corresponding to said signal, said conversion circuit including a plurality of switch means having first terminals coupled in common to said first terminal of said semiconductor laser beam source and a plurality of resistors of different values having first terminals coupled to corresponding first terminals of ones of said switch means and second terminals coupled through a voltage source to said second terminal of said semiconductor laser beam source, said switch means being activated in accordance with said multilevel image signal.

7. The printing device of claim 6 further comprising a reading element disposed adjacent one end of said photoconductive drum for sensing the position of said laser beam at said end of said drum for outputting a signal for synchronizing said multilevel image outputting circuit.

8. The printing device of claim 7 wherein said multilevel image outputting circuit comprises a central processing unit; a memory operatively coupled to said central processing unit; a first in-first out circuit having an input coupled to outputs of said memory; a set-reset flip-flop having a first input coupled to said output of said reading element; and AND gate having a first input coupled to an output of said flip-flop and a second input coupled to a source of clock pulses; a first counter having a count input coupled to an output of said AND gate and an output coupled to a second input of said flip-flop, said output of said AND gate being coupled to a clock input of said first in-first out circuit; a second counter having a count input coupled to said output of said AND gate; a shift register having a data input coupled to an output of said first in-first out circuit and a clear terminal coupled to a second output of said flip-flop; and a latch having data inputs coupled to outputs of said shift register and a clock input coupled to an output of said second counter, outputs of said latch forming said multilevel image signal.

* * * * *